(12) United States Patent
Schmid et al.

(10) Patent No.: US 7,797,125 B2
(45) Date of Patent: Sep. 14, 2010

(54) METHOD AND DEVICE FOR DETERMINING THE ROLL ANGLE FOR OCCUPANT PROTECTION DEVICES

(75) Inventors: Michael Schmid, Kornwestheim (DE); Marc-Andre Golombeck, Fübingen (DE); Alfons Doerr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 11/885,924

(22) PCT Filed: Jan. 24, 2006

(86) PCT No.: PCT/EP2006/050380
§ 371 (c)(1),
(2), (4) Date: May 13, 2008

(87) PCT Pub. No.: WO2006/094856
PCT Pub. Date: Sep. 14, 2006

(65) Prior Publication Data
US 2008/0275664 A1    Nov. 6, 2008

(30) Foreign Application Priority Data
Mar. 11, 2005   (DE) ..................... 102005011243

(51) Int. Cl.
*G01P 15/00* (2006.01)
(52) U.S. Cl. ..................................... 702/141
(58) Field of Classification Search .................. 702/141
See application file for complete search history.

(56) References Cited

U.S. PATENT DOCUMENTS

| | | | | |
|---|---|---|---|---|
| 5,890,084 | A  | * | 3/1999 | Halasz et al. ............... 701/45 |
| 6,374,171 | B2 | * | 4/2002 | Weiberle et al. ............. 701/71 |
| 2006/0015237 | A1 | * | 1/2006 | Kroeninger et al. ......... 701/70 |
| 2006/0095181 | A1 | * | 5/2006 | Darvish ....................... 701/38 |

FOREIGN PATENT DOCUMENTS

| | | |
|---|---|---|
| EP | 1 258 399 | 11/2002 |
| WO | WO 01/44020 | 6/2001 |

\* cited by examiner

*Primary Examiner*—Aditya Bhat
(74) *Attorney, Agent, or Firm*—Kenyon & Kenyon LLP

(57) ABSTRACT

A method for determining the roll angle for occupant protection devices and a corresponding device are described. A transverse acceleration and a vertical acceleration of the vehicle are detected, and the roll angle of the vehicle is estimated based on the detected transverse acceleration and the detected vertical acceleration.

8 Claims, 2 Drawing Sheets

METHOD AND DEVICE FOR DETERMINING THE ROLL ANGLE FOR OCCUPANT PROTECTION DEVICES

RELATED APPLICATION INFORMATION

This application is a 371 application of PCT/EP2006/050380, which was filed on Jan. 24, 2006, which claims priority to German Patent Application No. DE 102005011243.9, which was filed in Germany on Mar. 11, 2005, the disclosures of which are incorporated herein by reference.

FIELD OF THE INVENTION

The present invention is directed to a method and device for determining the roll angle for occupant protection devices.

BACKGROUND INFORMATION

Statistics from the United States demonstrate the importance of passive safety in vehicle rollovers. In 1998, half of all single vehicle fatalities were attributed to a rollover. Vehicle rollovers account for approximately 20% of all vehicular accidents.

Traditional rollover detection systems consider the rolling motion and accelerations in x, y, and z directions of the vehicle. Reliable detection of a vehicle rollover is possible on this basis, but a decision as to whether a rollover is occurring is only made at a late point in time in the rollover. In certain cases of vehicle rollover preceded by an electronic stability maneuver, the occupant experiences a high lateral acceleration. Such maneuvers may result in a type of rollover known as a soil-trip rollover. In this regard, there is still potential for future occupant safety systems with regard to deployment behavior.

Conventional methods are based on analysis of a yaw rate sensor, for example, and two acceleration sensors that are integrated into a central airbag control unit. The yaw rate sensor ascertains the rotational speed about the longitudinal axis of the vehicle according to the gyroscope principle, and acceleration sensors additionally measure the vehicle acceleration in both the transverse and the vertical directions. The yaw rate is then analyzed in the main algorithm. Using the measured values from the acceleration sensors, it is possible to ascertain the type of rollover, but in addition, these values are used for a plausibility check. If the yaw rate algorithm detects a rollover, the safety devices are activated only if there is a simultaneous release by the plausibility check.

In another conventional method, a timely deployment decision in the case of a rollover having a high lateral acceleration is made possible by including a float angle and the lateral speed of the vehicle. In a conventional method for expanded rollover detection, an estimate of the lateral speed is made on the basis of a yaw rate and the vehicle speed in the longitudinal direction, taking into account the lateral acceleration, and this lateral speed represents a measure of the rollover probability of the vehicle in the case of lateral drift into the median strip. The float angle, as it is called, is used to determine the lateral speed.

In general, early deployment decisions for occupant protection devices, e.g., window airbags, are necessary and appropriate for a rollover. In addition to the lateral vehicle speed, the roll angle at the start of such a rollover event therefore constitutes an important quantity for predicting the rollover event. In cases of deployment decisions for irreversible occupant safety devices, the roll angle in particular plays an important role, so that the knowledge of the roll angle may be used to make a deployment decision accordingly earlier.

In the case of conventional technical approaches, the signals of the transverse and vertical acceleration sensors are used to detect only the type of rollover and to perform a plausibility check on the roll rate measured with a roll rate sensor and the roll angle calculated therefrom. For example, International Application WO 2001/044020 describes a method for determining the absolute angle of rotation of an object rotating about a horizontal axis, the absolute angle of rotation of the vehicle being able to be ascertained in a limited interval via a vertical acceleration sensor and a roll rate sensor.

With the conventional methods, the roll angle is not estimated independently of a roll rate sensor, which should ideally yield an independent estimate of the angle by integrating the roll rate over time. In addition, it is very difficult to determine very small angles (<5°) due to sensor noise of the roll rate sensor.

SUMMARY

An example method according to the present invention for determining the roll angle for occupant protection devices may have the advantage over the related art that the roll angle may be estimated continuously with the help of the signals of a transverse acceleration sensor and a vertical acceleration sensor, independently of the roll rate sensor and without restriction of the roll angle range, and may be made available at an early point in time to at least one deployment method for occupant safety devices. The following deployment methods for occupant protection systems are able to detect vehicle rollovers at an early point in time due to the provided roll angle, which makes it possible to ensure that safety devices such as seatbelt tightening systems, head airbags, window airbags, and roll bars are activated in a timely manner, thereby reducing the risk of injury. The example method according to the present invention for determining the roll angle may advantageously permit an improvement in the calculation of deployment decisions for occupant protection systems.

As another advantage, the example method according to the present invention for determining the roll angle may increase the stability of the downstream deployment methods, in particular in the range of small roll angles, and improves their reset performance. Therefore, improved deployment performance may be achieved in an advantageous manner, stable driving situations and misuses may be recognized better, and inadvertent deployment of irreversible restraint devices may be prevented.

Furthermore, the example method according to the present invention for estimating the roll angle may additionally be used for a roll rate sensor to support roll angle estimation via the roll rate sensor in an advantageous manner. This makes it possible to effectively suppress roll rate sensor drift or offset integration. The example method according to the present invention makes it possible to reliably differentiate driving situations, determine the roll angle alternatively and thus improve the reset performance of the roll angle determined by integration. The deployment and reset performance of the deployment methods may therefore be further improved due to the additional option of determining the roll angle.

An example device according to the present invention for determining the roll angle for occupant protection devices may have the advantage that two acceleration sensors may be used for detecting the transverse acceleration and for detecting the vertical acceleration, so that a roll angle sensor is unnecessary. Eliminating the roll rate sensor reduces the cost of the particular control unit. If the example device according to the present invention is used as an alternative path and to support the roll angle calculation, two alternative paths are available for determining the roll angle in an advantageous manner, thereby increasing the stability of the deployment methods for occupant protection devices.

It may be particularly advantageous if the detected transverse acceleration is compared to a first threshold value and the detected vertical acceleration is compared to a second threshold value. It is therefore possible to estimate roughly whether the instantaneous roll angle is a small roll angle, e.g., less than or equal to 10°, or a large roll angle, e.g., greater than 10°. If it is a large roll angle, i.e., if the transverse acceleration is greater than the first threshold value and the vertical acceleration is greater than the second threshold value, the subsequent more precise estimation is performed in a first approximation. If the roll angle is small, i.e., if the transverse acceleration is less than or equal to the first threshold value and/or the vertical acceleration is less than or equal to the second threshold value, the subsequent more detailed estimation is performed with a second approximation which requires fewer computational operations and therefore may be performed more rapidly.

To estimate the roll angle, the trigonometric functions are approximated by the corresponding Taylor series expansions, for example, a sine function of the roll angle being approximated for the first and second approximations according to $\sin\alpha \approx \alpha + o(\alpha^2)$ and a cosine function of the roll angle being approximated for the first approximation according to $\cos\alpha \approx 1 - (\alpha^2/2) + o(\alpha^4)$ and for the second approximation according to $\cos\alpha \approx 1 + o(\alpha^2)$. In the first and second approximations, the higher orders of the exponent of the roll angle are disregarded.

It may be advantageous in particular if the estimated roll angle is compared to a limit angle, an error flag being set when the estimated roll angle exceeds the limit angle and the estimated roll angle being output otherwise. This avoids the use of implausible roll angles in the subsequent deployment methods for the occupant protection means.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

In general, early decisions for deployment of occupant protection means, e.g., seat belt tightening systems, head airbags, window airbags, and roll bars, are necessary and appropriate in the event of a rollover. In addition to the lateral vehicle speed, the roll angle at the beginning of such a rollover event therefore constitutes an important parameter for calculating the rollover in advance. With the conventional technical approaches, the signals of the transverse acceleration sensor and the vertical acceleration sensor are used only for detecting the type of rollover and for performing a plausibility check on the roll rate measured with a roll rate sensor and the roll angle calculated therefrom.

Furthermore, using a conventional method for determining the absolute angle of rotation of an object rotating about an approximately horizontal axis, the absolute angle of rotation of the vehicle is able to be determined using a vertical acceleration sensor and a roll rate sensor within a limited interval.

In accordance with an example embodiment of the present invention, a method is provided for determining the roll angle for occupant protection devices and a corresponding device, this device detecting a transverse acceleration and a vertical acceleration of the vehicle and estimating the roll angle of the vehicle based on the detected transverse acceleration and the detected vertical acceleration.

Figure 1:
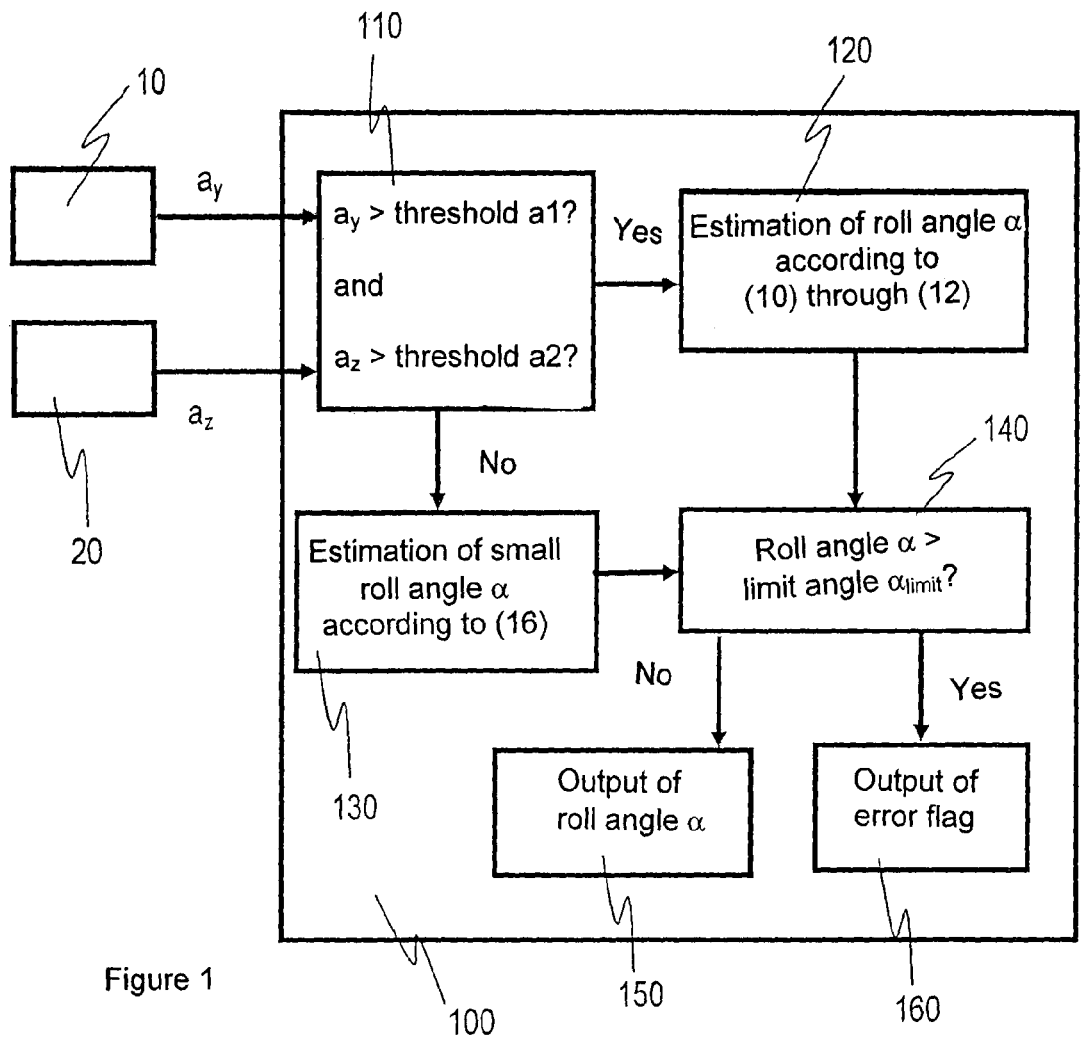
FIG. 1 shows a schematic block diagram of a method and a device for determining the roll angle for occupant protection devices.

As FIG. 1 shows, an example device according to the present invention for determining the roll angle for occupant protection devices includes a first acceleration sensor 10 for detecting a transverse acceleration $a_y$, a second acceleration sensor 20 for detecting a vertical acceleration $a_z$ and an analyzer unit 100 that estimates roll angle $\alpha$ of the vehicle based on detected transverse acceleration $a_y$ and detected vertical acceleration $a_z$.

The mathematical principles and the equations derived from them, which are used by analyzer unit 100 for continuous determination of the instantaneous roll angle, are described below. The accelerations, which may be measured by a sensor at the center of gravity of the vehicle in proximity to the roll axis, may be calculated in world coordinates by analyzer unit 100 from the external accelerations acting on the vehicle via homogeneous transformation according to equation (1).

$$\vec{a}_{sensor} = X * \vec{a}_{external} \tag{1}$$

The external acceleration vector is composed of an acceleration component in the x direction, which is influenced by depressing the accelerator or the brake pedal of the vehicle, a centripetal acceleration component in the y direction, which occurs in particular when turning a corner or driving in a circle, and the gravitational acceleration component in the z direction. Rotation of the vehicle about its longitudinal axis by a roll angle $\alpha$ is represented by multiplying the external acceleration vector by a 3×3 matrix according to equation (2).

$$\vec{a}_{sensor} = \begin{pmatrix} 1 & 0 & 0 \\ 0 & \cos\alpha & -\sin\alpha \\ 0 & \sin\alpha & \cos\alpha \end{pmatrix} * \begin{pmatrix} -\dot{v} \\ \dfrac{v^2}{r} \\ g \end{pmatrix} \tag{2}$$

Since first acceleration sensor 10 detects only transverse acceleration $a_y$ of the vehicle, i.e., the y component, and second acceleration sensor 20 detects only vertical acceleration $a_z$ of the vehicle, i.e., the z component, only relationships (3) and (4) which pertain to the x and y components of the vehicle acceleration are considered below after the matrix multiplication.

$$a_y = \cos\alpha * \dfrac{v^2}{r} - \sin\alpha * g \tag{3}$$

$$a_z = \sin\alpha * \dfrac{v^2}{r} + \cos\alpha * g \tag{4}$$

In equations (3) and (4), roll angle α and also centripetal acceleration $$\frac{v^2}{r}$$

are unknown, acceleration components $a_y$ and $a_z$ being available as measured values and gravitational acceleration g being available as a constant. Centripetal acceleration $$\frac{v^2}{r}$$

may be determined from equations (3) and (4). Since knowledge of vehicle speed v or curve radius r is not necessary for the following methods, centripetal acceleration $$\frac{v^2}{r}$$

may be determined as a single quantity. Since all quantities in equations (3) and (4) except for roll angle α are known, the two unknowns, namely centripetal acceleration $$\frac{v^2}{r}$$

and roll angle α, may be calculated unambiguously therefrom.

By squaring and then adding equations (3) and (4), centripetal acceleration $$\frac{v^2}{r}$$

may be determined according to equation (5).

$$\frac{v^2}{r} = \pm\sqrt{a_y^2 + a_z^2 - g^2} \quad (5)$$

To calculate roll angle α from equations (3) and (4), the trigonometric functions are approximated by the corresponding Taylor series expansion. Equation (6) shows the Taylor series expansion for the sine function, and equation (7) shows the Taylor series expansion for the cosine function.

$$\sin\alpha \approx \alpha + o(\alpha^3) \quad (6)$$

$$\cos\alpha \approx 1 - \frac{\alpha^2}{2} + o(\alpha^4) \quad (7)$$

For the remaining course, the higher orders of the exponent of α are disregarded in the series expansions. Thus, equation (8) is obtained after inserting approximation (6) into equation (3), and equation (9) is obtained by inserting approximation (7) into equation (4).

$$a_y = \left(1 - \frac{\alpha^2}{2}\right) * \frac{v^2}{r} - \alpha * g \quad (8)$$

$$a_z = \alpha * \frac{v^2}{r} + \left(1 - \frac{\alpha^2}{2}\right) * g \quad (9)$$

Equations (8) and (9) may each be solved separately for roll angle α by inserting centripetal acceleration $v^2/r$ from equation (5). In addition, this also yields other options for combining equations (8) and (9) to calculate roll angle α. A few important examples are given below.

For example, multiplication or division of equations (8) and (9) after solving for the resulting quadratic equation yields equation (10).

$$\alpha_{1/2} = \frac{-\left(\frac{v^2}{r} * a_z + g * a_z\right) \pm \sqrt{\left(\frac{v^2}{r} * a_y + g * a_z\right)^2 + 2 * \left(\frac{v^2}{r} * a_z + g * a_y\right)^2}}{\left(\frac{v^2}{r} * a_z + g * a_y\right)} \quad (10)$$

Addition or subtraction of equations (8) and (9) after solving for the resulting quadratic equations yields equation (11).

$$\alpha_{1/2} = \frac{\left(\frac{v^2}{r} - g\right) \pm \sqrt{\left(\frac{v^2}{r} - g\right)^2 + 2\left(\frac{v^2}{r} + g\right) * \left(g + \frac{v^2}{r} - a_y - a_z\right)}}{\left(\frac{v^2}{r} + g\right)} \quad (11)$$

An advantageous variant is obtained when equations (8) and (9) are each solved for quadratic term $\alpha^2$ and then equated. This yields linear equation (12), which has only a single solution for roll angle α:

$$\alpha = \frac{-a_y * g + a_z * \frac{v^2}{r}}{g^2 + \left(\frac{v^2}{r}\right)^2} \quad (12)$$

The valid angle range of equations (10) through (12) is restricted by the first approximation of the trigonometric functions according to equations (6) and (7).

Figure 2:
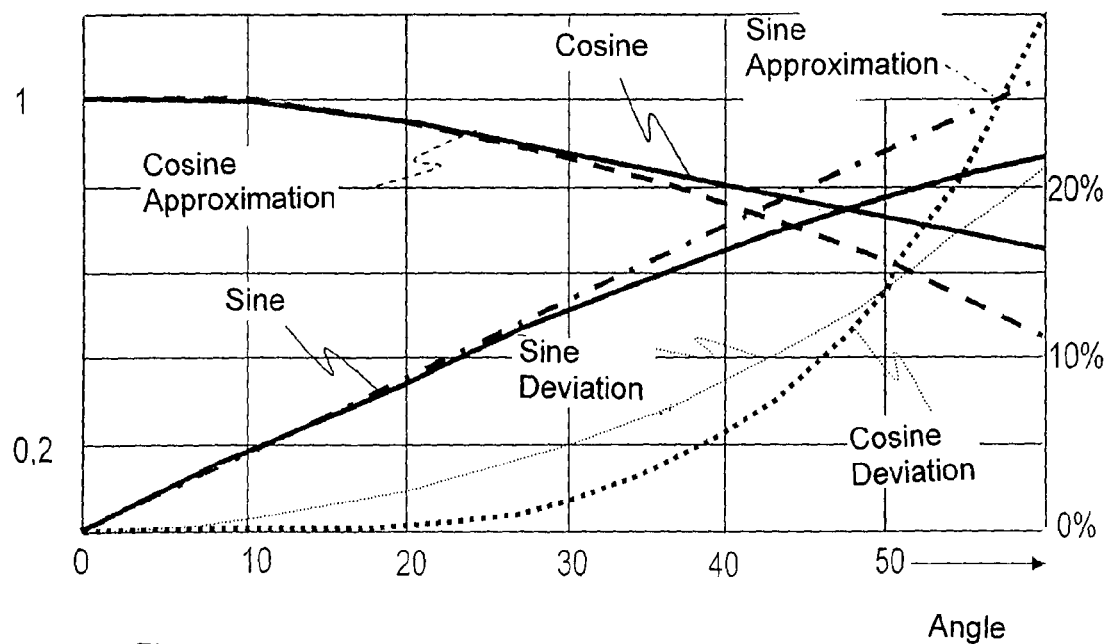
FIG. 2 shows a schematic diagram of the proximity functions of a sine function and a cosine function.

FIG. 2 shows the trigonometric functions as solid lines, the corresponding approximations according to equations (6) and (7) as dashed lines for the approximated cosine function and as a dash-dot line for the sine function as well as the approximation errors in percentage as a bold dotted line for the cosine function and as a light dotted line for the sine function. As FIG. 2 shows, the deviation of the approximation functions is less than 10% for a roll angle of up to approximately 45°. At very small roll angles, e.g., roll angles α≦10°, the approximation from equation (7) may be further simplified for the cosine function. The simple approximation according to equation (13) is then obtained for the cosine.

$$\cos\alpha \approx 1 + o(\alpha^2) \quad (13)$$

If the approximations from equations (6) and (13) are inserted into equations (3) and (4), respectively, this yields equations (14) and (15).

$$a_y = \frac{v^2}{r} - \alpha * g \quad (14)$$

$$a_z = \alpha * \frac{v^2}{r} + g \quad (15)$$

If equations (14) and (15) are each solved for centripetal acceleration $$\frac{v^2}{r}$$

and then equated, this yields equation (16):

$$\alpha_{1/2} = \frac{-a_y \pm \sqrt{a_y^2 - 4*g*(g-a_z)}}{2*g} \quad (16)$$

The advantage of equation (16) is that this equation performs the estimation of roll angle α without centripetal acceleration $$\frac{v^2}{r},$$

which may be calculated according to equation (5). This eliminates several computation operations, e.g., taking the square root in equation (5), so that the operations for estimating roll angle α are faster.

As FIG. 1 also shows, the calculations and approximations described above are executed in analyzer unit 100. Thus, to differentiate whether instantaneous roll angle α is a small angle, e.g., roll angle α≦10° or whether instantaneous roll angle α is a larger angle, i.e., roll angle α>10°, a check is performed in block 110 to ascertain whether detected transverse acceleration $a_y$ is greater than a first threshold value a1 and whether detected vertical acceleration $a_z$ is greater than a second threshold value a2.

If both detected acceleration values $a_y$ and $a_z$ are greater than their particular threshold values, it is then concluded that instantaneous roll angle α has a greater value and the instantaneous roll angle is estimated in block 120 according to equation (10) and/or equation (11) and/or equation (12). Estimated roll angle α is then compared in block 140 to a predetermined limit angle $\alpha_{limit}$. If the estimated roll angle is equal to or greater than predetermined limit angle $\alpha_{limit}$, the estimated value for roll angle α is discarded and an error flag is output in block 160. If estimated roll angle α is less than preselected limit angle $\alpha_{limit}$, estimated roll angle α is regarded as plausible and is output in block 150, e.g., to downstream deployment methods for occupant protection devices which take the instantaneously estimated roll angle into account in the deployment decision.

If the check in block 110 reveals that neither detected acceleration value $a_y$ nor $a_z$ is greater than its particular threshold value, it is concluded that instantaneous roll angle α has a smaller value. The instantaneous roll angle is then estimated in block 130 according to equation (16). Estimated roll angle α is then compared to a preselected limit angle $\alpha_{limit}$ in block 140. As explained above, the error flag is set in block 160 or the estimated roll angle is output in block 150 as a function of the result of this comparison.

Figure 3:
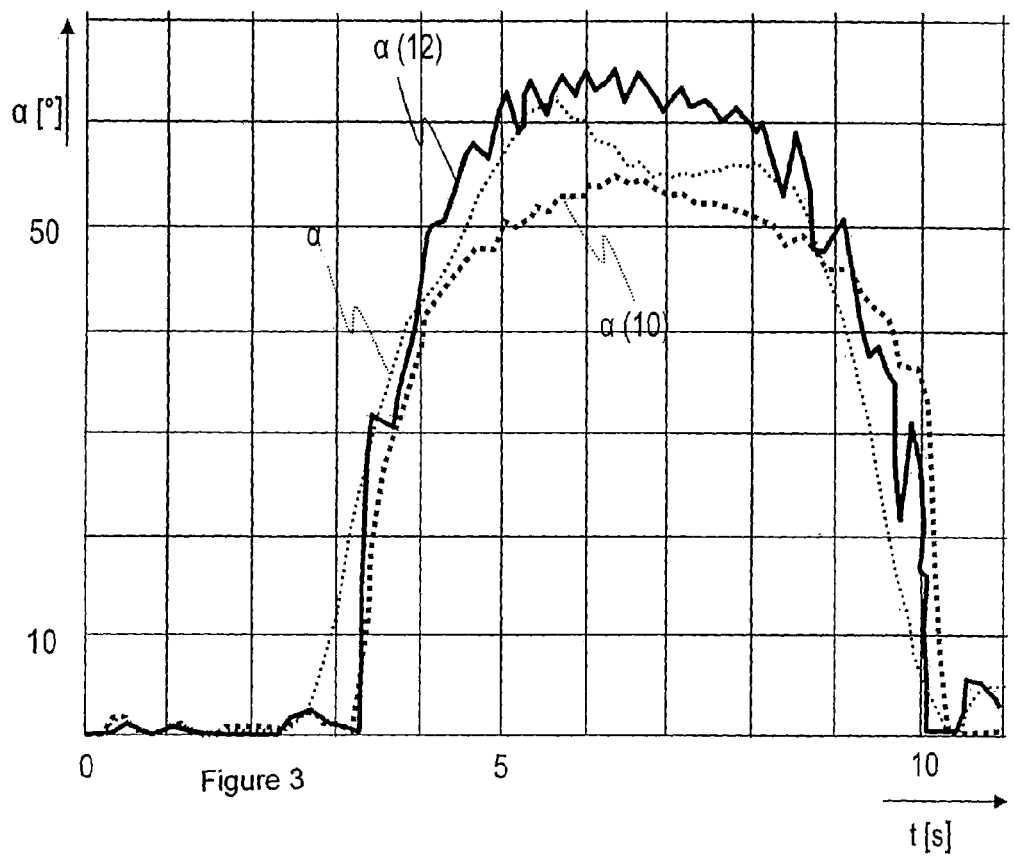
FIG. 3 shows a schematic diagram of the curves of various methods for estimating the roll angle while driving on a steep curve.

FIG. 3 shows a schematic diagram of the curves for various methods of estimating the roll angle while driving around a steep curve. The dotted line labeled as α denotes the curve of the roll angle determined by traditional roll rate integration. The bold line labeled as α(12) denotes the curve of roll angle α determined by the method according to the present invention using equation (12). The bold dotted line labeled as α(10) denotes the curve of roll angle α determined by the method according to the present invention using equation (10).

Figure 4:
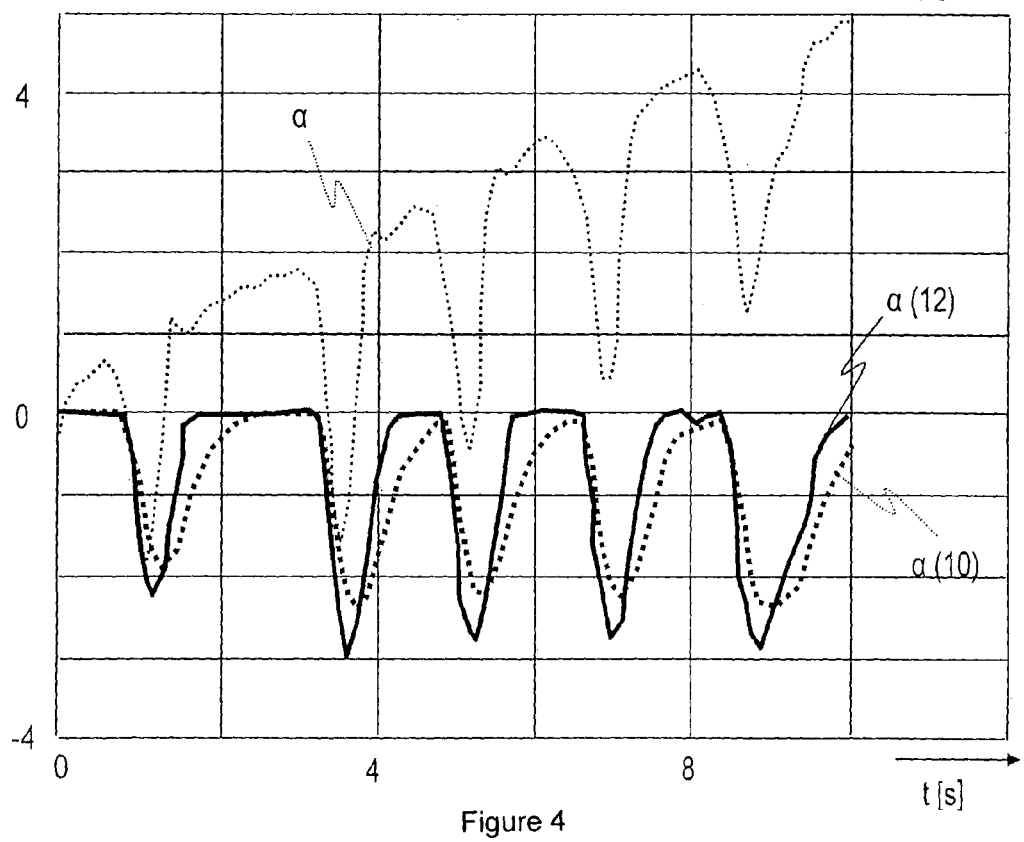
FIG. 4 shows a schematic diagram of the curves of different methods for estimating the roll angle while driving in a circle.

FIG. 4 shows a schematic diagram of the curves for various methods for estimating the roll angle while driving in a circle. The dotted line labeled as α denotes the curve of the roll angle determined by traditional integration of the roll rate. The bold line labeled as α(12) denotes the curve of roll angle α determined by the method according to the present invention using equation (12). The bold dotted line labeled as α(10) denotes the curve of roll angle α determined by the method according to the present invention using equation (10). As FIG. 4 shows, curve α, representing the integration of the angle by the roll rate, shows a definite drift due to a roll rate offset, which is a disadvantage in the determination of the angle based on roll rate. The two other curves α(10) and α(12) show that this problem does not occur with the example method according to the present invention for determining the roll angle based on detected acceleration components $a_y$ and $a_z$.

What is claimed is:

1. A method for determining a roll angle for triggering an occupant protection device comprising:
   detecting, by a processor, a transverse acceleration ($a_y$) and a vertical acceleration ($a_z$) of the vehicle; and
   estimating, by the processor, the roll angle (α) of the vehicle based on the detected transverse acceleration ($a_y$) and the detected vertical acceleration ($a_z$);
   wherein the estimating includes comparing the detected transverse acceleration ($a_y$) to a first threshold value and comparing the detected vertical acceleration ($a_z$) to a second threshold value, the roll angle (α) being estimated using a first approximation when the transverse acceleration ($a_y$) is greater than the first threshold value and the vertical acceleration ($a_z$) is greater than the second threshold value, and the roll angle (α) being estimated using a second approximation when at least one of the transverse acceleration ($a_y$) is less than or equal to the first threshold value and the vertical acceleration ($a_z$) is less than or equal to the second threshold value, and
   wherein trigonometric functions for estimating the roll angle (α) are approximated by corresponding Taylor series expansions, a sine function of the roll angle (α) being approximated according to sin α≈α+o($\hat{a}^2$) for the first and second approximations, a cosine function of the roll angle (α) being approximated according to cos α≈1−α²/2+o(α⁴) for the first approximation and being approximated according to cos α≈1+o(α²) for the second approximation.

2. The method as recited in claim 1, wherein the estimated roll angle (α) is compared to a limit angle, an error flag being set when the estimated roll angle (α) exceeds the limit angle and the estimated roll angle (α) being output otherwise.

3. The method as recited in claim 1, wherein the roll angle (α) is estimated in the first approximation according to the equation $$\alpha_{1/2} = \frac{-\left(\frac{v^2}{r}*a_z + g*a_z\right) \pm \sqrt{\left(\frac{v^2}{r}*a_y + g*a_z\right)^2 + 2*\left(\frac{v^2}{r}*a_z - g*a_y\right)^2}}{\left(\frac{v^2}{r}*a_z - g*a_y\right)}.$$

4. The method as recited in claim 3, wherein a centripetal acceleration $$\left(\frac{v^2}{r}\right)$$

is calculated according to an equation $$\frac{v^2}{r} = \pm\sqrt{a_y^2 + a_z^2 - g^2}\ .$$

5. The method as recited in claim 3, wherein the roll angle ($\alpha$) is estimated in the second approximation according to an equation $$\alpha_{1/2} = \frac{-a_y \pm \sqrt{a_y^2 - 4*g*(g - a_z)}}{2*g}\ .$$

6. The method as recited in claim 1, wherein the roll angle ($\alpha$) is estimated in the first approximation according to the equation $$\alpha_{1/2} = \frac{-\left(\frac{v^2}{r} - g\right) \mp \sqrt{\left(\frac{v^2}{r} - g\right)^2 + 2*\left(\frac{v^2}{r} + g\right)*\left(g + \frac{v^2}{r} - a_y - a_z\right)}}{\left(\frac{v^2}{r} + g\right)}\ .$$

7. The method as recited in claim 1, wherein the roll angle ($\alpha$) is estimated in the first approximation according to the equation $$\alpha = \frac{-a_y*g + a_z*\frac{v^2}{r}}{g^2 + \left(\frac{v^2}{r}\right)^2}\ .$$

8. A device for determining a roll angle for an occupant protection device, comprising:
   a first acceleration sensor adapted to detect a transverse acceleration ($a_y$) of a vehicle;
   a second acceleration sensor adapted to detect a vertical acceleration ($a_z$) of the vehicle; and
   an analyzer unit adapted to estimate the roll angle ($\alpha$) of the vehicle based on the detected transverse acceleration ($a_y$) and the detected vertical acceleration ($a_z$),
   wherein the analyzer unit is adapted to compare the transverse acceleration ($a_y$) to a first threshold value and the vertical acceleration ($a_z$) to a second threshold value and, depending on results of the comparison, estimate the roll angle ($\alpha$) using a first approximation or using a second approximation, and
   wherein trigonometric functions for estimating the roll angle ($\alpha$) are approximated by corresponding Taylor series expansions, a sine function of the roll angle ($\alpha$) being approximated according to $\sin\alpha \approx \alpha + o(\alpha^2)$ for the first and second approximations, a cosine function of the roll angle ($\alpha$) being approximated according to $\cos\alpha \approx 1 - \alpha^2/2 + o(\alpha^4)$ for the first approximation and being approximated according to $\cos\alpha \approx 1 + o(\alpha^2)$ for the second approximation.

* * * * *